United States Patent Office 2,916,506
Patented Dec. 8, 1959

2,916,506

MANUFACTURE OF CYCLOPENTADIENYL-MANGANESE COMPOUNDS

William R. Axtell, J Byron Bingeman, and Albert P. Giraitis, Baton Rouge, La., assignors to Ethyl Corporation, New York, N.Y., a corporation of Delaware No Drawing. Application November 22, 1957
Serial No. 698,044

6 Claims. (Cl. 260—429)

This invention relates to a process for producing organo manganese compounds and more particularly to a novel process for recovering cyclopentadienyl manganese tricarbonyl compounds from impure reaction products containing the same.

Cyclopentadienyl manganese tricarbonyl compounds have been found to be very effective antiknocks for gasoline, used in internal combustion engines. One preferred method of manufacture of these compounds involves a three-step process: (1) reaction of an alkali metal with a cyclopentadiene hydrocarbon; (2) reaction of manganous chloride with the cyclopentadienyl alkali metal compound formed in step 1; and (3) reaction of the bis(cyclopentadienyl) manganese compound formed in step 2 with carbon monoxide. All of the above steps are conducted in an ether or amine solvent.

The above process steps are usually carried out sequentially, without separation of by-products. Thus, the cyclopentadienyl manganese tricarbonyl compounds are obtained in a crude reaction mixture with large quantities of inorganic salt, organic dimers and other polymers and minor quantities of various organo-manganese derivatives. The high polymers and salt can be separated from the more volatile compounds, including the desired product, by distillation, e.g. vacuum or steam distillation. However, rectification of the volatile fraction of the crude product requires a large number of separate steps and results in considerable operational difficulty.

This volatile fraction of the crude reaction mixture contains cyclopentadiene polymer (primarily dimer), solvent, and volatile or organo manganese compounds including the desired cyclopentadienyl manganese tricarbonyl compound. In addition the volatile fraction usually contains a relatively high boiling hydrocarbon such as an aromatic compound which is effectively used as a suspending agent to aid in the initial removal of the inorganic impurities and the high polymers. Most of the suspending agent is separated with the impurities but small quantities frequently carry over with the volatile products and require separation e.g. fractionation from the desired product.

In either batch or continuous distillation, considerable difficulty is encountered due to decomposition of various components in the above impure product. The polymer, although relatively high boiling, tends to decompose below its boiling temperature and results in frothing and generally unpredictable process conditions during fractionation of the various components. Moreover, it is virtually impossible to obtain a clean separation of components since during fractionation, these relatively high boiling components of the reaction mixture decompose resulting in the formation of much lower boiling components such as cyclopentadiene monomer which upsets the condition in fractioning columns or other separation equipment.

It is accordingly an object of this invention to provide an improved process for recovery of cyclopentadienyl manganese tricarbonyl compounds. Another object is to provide a recovery process which is readily adaptable to large scale commercial operation and permits efficient separation of the various components of the mixture and very small and efficient control of the process. Still another object is to provide a recovery process whereby the cyclopentadienyl manganese tricarbonyl compound can be recovered in especially high yields and purity with a minimum of process steps. Still another object is to provide a process in which the components such as solvent and unreacted cyclopentadiene compound can be recovered essentially free of the cyclopentadienyl manganese tricarbonyl so as to permit recycle to the process without materially poisoning the reaction. Other objects and advantages of this invention will become more apparent from the following description and appended claims.

It has now been found that the impure reaction mixture containing a cyclopentadienyl manganese tricarbonyl product can be stabilized to permit simple and efficient fractionation of its components if the mixture is initially subjected to elevated temperatures i.e. above about 160° C. and preferably above about 200° C. for a period sufficient to decompose unstable components of the reaction mixture. It has been found that this thermal treatment can be conducted to selectively decompose undesired components while still not decomposing the desired cyclopentadienyl tricarbonyl manganese product. Following such thermal decomposition, the resulting impure mixture can then be fractionated or otherwise separated without continued decomposition, thus permitting efficient and complete fractionation of the different components of the mixture.

More specifically the process of this invention is useful in separating a cyclopentadienyl manganese tricarbonyl compound from an impure reaction product containing the same and also containing quantities of unreacted cyclopentadiene hydrocarbon compound in polymeric form, comprising subjecting the impure product to a temperature of above about 160° C. and preferably above about 200° C. for a period of time sufficient to depolymerize the cyclopentadiene compound and thermally stabilize the reaction product and thereafter fractionating the stabilized reaction product to separate the cyclopentadiene compound from the cyclopentadienyl manganese tricarbonyl compound.

The chemical steps of the process normally employs a solvent, usually an ether or an amine, which it is necessary to separate and recover from the product. With low boiling solvents, such as diethyl ether, this separation can be conducted prior to the thermal treatment by simple distillation. With higher boiling solvents, such as with the preferred diethylene glycol lower dialkyl ether solvents, e.g. diethylene glycol dimethyl ether, diethylene glycol methyl ethyl ether and other homologs containing alkyl groups having 1 to 3 carbon atoms, the solvent separation can be conducted simultaneously with the thermal treatment or with still higher boiling solvents i.e. solvents boiling higher than the product, such as when diethylene glycol dibutyl ether is used in the manufacture of methylcyclopentadienyl manganese tricarbonyl, the solvent can be removed after the thermal treatment.

In the preferred embodiment of this invention, the thermal treatment is carried out simultaneously with fractionation of one or more of the volatile components, such as the solvent or cyclopentadiene compound or both. Thus, this distillation can be conducted under sufficient pressure to maintain the distillation temperature above the desired thermal decomposition temperature i.e. 160° C. to simultaneously stabilize the mixture and separate certain of its components. Simultaneous separation of both the solvent and cyclopentadiene compound is particularly desirable since both can be recycled to the process and separation prior to recycle is usually unnecessary. However, it is usually desirable to dimerize the cyclopentadiene compound e.g. cyclopentadiene or methylcyclopentadiene, prior to recycle if relatively high temperatures i.e. above 100° C. are employed in the sodium reaction. This substantialy reduces the reactivity of the hydrocarbon with sodium and avoids an unduly violent reaction.

It is also found that in using the process of this invention, the solvent and cyclopentadiene compound are surprisingly free of product, thus making recycle directly to the process possible without poisoning the chemical reactions.

The benefits of the present process are particularly surprising and unexpected. It is very unusual to be able to heat an organo-metallic compound, particularly an organo manganese compound, to such high temperatures, even in the presence of impurities which would normally be expected to catalyze decomposition. Moreover, the present recovery process is capable of providing much sharper separations of the reaction components than has been heretofore thought possible. The present technique eliminates completely frothing in the fractionation operations, especially in continuous operations which has previously seriously interfered with the necessary separations and in some cases made fractionation impossible.

A wide variety of cyclopentadienyl manganese tricarbonyl compounds can be recovered by the process of this invention. In general, any manganese tricarbonyl compound containing a molecule including the 5 carbon atom ring structure found in cyclopentadiene itself is suitable for recovery by the process of this invention. The process is particularly suitable for compounds containing up to above 10 carbon atoms. The process is particularly suitable for compounds containing a cyclopentadienyl group having 5 to 13 carbon atoms. Typical examples of compounds which can be recovered by the process of this inveniton are cyclopentadienyl manganese tricarbonyl, methylcyclopentadienyl manganese tricarbonyl, ethylcyclopentadienyl manganese tricarbonyl, dimethylcyclopentadienyl manganese tricarbonyl, n-decyl cyclopentadienyl manganese tricarbonyl, phenylcyclopentadienyl manganese tricarbonyl, methylphenylcyclopentadienyl manganese tricarbonyl, indenyl manganese tricarbonyl, fluorenyl manganese tricarbonyl, and the like.

The impure reaction products which can be treated in accordance with this invention contain both the cyclopentadienyl manganese tricarbonyl compound and unreacted cyclopentadiene hydrocarbon, primarily in polymeric form, e.g. dimeric form. This reaction product is produced from any of the presently known processes for manufacture of these compounds. The cyclopentadiene hydrocarbon polymer results in most instances both from unreacted monomer, which subsequently polymerizes, and from cyclopentadienyl radicals freed during reaction of bis(cyclopentadienyl) compounds with carbon monoxide, forming the corresponding mono-cyclopentadienyl manganese tricarbonyl compound.

The residence time of the thermal stabilizing treatment varies depending upon the temperature employed and the particular cyclopentadienyl compound involved. In other words, higher temperatures and less stable polymers require shorter period of thermal treatment. Normally, the impure reaction mixture is maintained at a temperature above 160° C. for a period of at least one minute, and usually for a period of at least 10 minutes to insure complete stabilizing of the mixture. This treatment is ordinarily of a duration not greater than an hour or at most a few hours.

The following examples illustrate the process of the present invention. In these examples, the parts are given as parts by weight, unless otherwise indicated.

EXAMPLE I

Methylcyclopentadiene dimer is gradually added to sodium metal (1526 parts) in diethylene glycol dimethyl ether (4313 parts) in a reactor provided with heating means and means to agitate the mixture. The solvent was previously used in other similar reactions. The total feed of methylcyclopentadiene over a 2-hour period was 5870 parts. The reaction was continued for 1 hour at 185° C. and thereafter the temperature was raised to 190° C. for an additional hour to complete the reaction. The reaction mixture was stirred during the entire reaction. Hydrogen gas was evolved and recovered from the reactor. Thereafter, 4278 parts of flaked, anhydrous manganous chloride (97 percent pure) was added to the reaction mixture and the reaction was maintained at a temperature of 165° until all evidence of reaction had ceased. The mixture was also agitated during this second reaction. The reaction mixtuer was then transferred to a pressure vessel provided with an agitator and to this second reaction mixture was added carbon monoxide at a pressure of 300 p.s.i.g. The total carbon monoxide consumed in the reaction was 2450 parts. The reaction was maintained at a temperature of 193° C.

The crude third reaction mixture was then discharged to a vacuum distillation still and the volatile components removed by distilaltion at a pressure of about 20 millimeters of mercury. The overhead temperature at the end of this vacuum distillation was between 80 and 110° C. When most of the volatile material was removed, 5640 parts of a high boiling hydrocarbon suspending agent, which is predominantly benzene and naphthalene derivatives, was added to the still. This aromatic mixture has an initial boiling point of about 145° C. at 20 millimeters mercury pressure. The vacuum distillation was continued until no volatile materials were left in the residue.

The impure volatile fractionation of the crude reaction mixture is then heated to a temperature of 230° C. under 50 p.s.i.g. pressure and maintained at this temperature for a period of one hour to stabilize the mixture for subsequent separation. This stabilized mixture is then passed into a distillation column having 25 plates. The column is maintained at atmospheric pressure. The overhead stream from this column is taken out at a temperature of 155° C. and has the following composition:

| | Parts |
|---|---|
| Light ends | 1.1 |
| Methylcyclopentadiene | 6.7 |
| Diethylene glycol dimethyl ether | 21.4 |
| Methylcyclopentadienyl manganese tricarbonyl | 0.1 |

The above overhead stream is thereafter fed to a second fractionating column having 25 plates and fractionated at atmospheric pressure. The overhead fraction is taken off at 150° C. and contains about 16.4 parts of diethylene glycol dimethyl ether, 6.6 parts of methylcyclopentadiene, and 1.1 parts of light ends. This stream contains only a trace of methylcyclopentadienyl manganese tricarbonyl. This stream is recycled to the process for reaction with additional sodium metal. However, prior to recycling the solvent and cyclopentadiene compound mixture, the methylcyclopentadienyl is subjected to dimerization, i.e. maintained at a temperature of 107° C. for 4 hours to avoid an unduly violent reaction in the sodium reactor. The bottoms from the solvent column are removed at a temperature of 225° C. and are recycled to the first fractionating column along with the impure reaction mixture.

The bottoms from the first fractionation contains the following composition:

| | Parts |
|---|---|
| Diethylene glycol dimethyl ether | 2.4 |
| Methylcyclopentadienyl manganese tricarbonyl | 34.1 |
| Aromatic suspending agent | 34.2 |

This stream is then passed into a third fractionation column operating at about 375 p.s.i.g. The overhead from this third column contains only about 0.1 part of methylcyclopentadiene, 2.4 parts of diethylene glycol dimethyl ether, and about 1.1 parts of methylcyclopentadienyl manganese tricarbonyl. This stream is also recycled to the first column, along with the bottoms of the second column. The bottoms from the third column is principally product, methylcyclopentadienyl manganese tricarbonyl, and the aromatic suspending agent. In instances where no suspending agent is employed or where a very high boiling suspending agent is used, this stream is virtually pure methylcyclopentadienyl manganese tricarbonyl. In this example, the bottoms contains about a 50/50 weight mixture of the product and the hydrocarbon is passed to a fourth column, maintained at a pressure of 190 p.s.i.g. The methylcyclopentadienyl manganese tricarbonyl is removed overhead at a temperature of 190° C. The bottoms from the fourth column is principally the aromatic hydrocarbon suspending agent and this stream is recycled to the initial distillation still wherein the volatile components of the crude reaction mixtures are separated from the inorganic impurities and polymer.

In second and subsequent cycles only about 0.085 part of methylcyclopentadienyl manganese tricarbonyl were present in the sodium reaction per part of sodium metal. The recovered yield of methylcyclopentadienyl manganese tricarbonyl in each of the cycles discussed above is about 80 percent.

The purified methylcyclopentadienyl manganese tricarbonyl compound when mixed with gasoline increases appreciably the octane rating of the gasoline. The following table illustrates the effectiveness of methylcyclopentadienyl manganese tricarbonyl, using a commercial gasoline having an initial boiling point of 94° F. and a final boiling point of 390° F. The antiknock value of the fuel determined by the ratings are given in octane numbers for figures below 100 and in Army-Navy performance numbers for values above 100. The method of determining performance numbers is explained in the booklet, "Aviation Fuels and Their Effect Upon Engine Performance," NAVAER–06–5–501, USAF T.O. No. 06–5–54, published in 1951.

Table

COMMERCIAL GASOLINE HAVING AN I.B.P. OF 94° F. AND AN F.B.P. OF 390° F.

| $C_6H_7Mn(CO)_3$, g. metal/gal.: | Octane rating |
|---|---|
| 0 | 83.1 |
| 1.0 | 92.7 |
| 2.0 | 95.8 |
| 3.0 | 98.0 |
| 5.0 | 102.0 |

EXAMPLE II

Example I is repeated except that the three chemical reactions are conducted in 6040 parts of diethyl ether instead of diethylene glycol dimethyl ether. The sodium reaction is carried out at 40° C. In this instance, the diethyl ether is removed by distillation prior to the thermal stabilizing treatment of the impure methylcyclopentadienyl manganese tricarbonyl reaction product. Also, the thermal treatment in this instance is conducted at 220° C. for 45 minutes. Upon separation of the polymerized methylcyclopentadiene this monomer is recycled directly to the sodium reaction without dimerization.

EXAMPLE III

Example I is repeated except that cyclopentadiene is reacted instead of methylcyclopentadiene and the thermal stabilizing treatment is conducted at 240° C. The product is pure cyclopentadienyl manganese tricarbonyl.

EXAMPLE IV

The procedure employed in Example I is used in reacting hexylcyclopentadiene with sodium, followed by reaction of the corresponding hexylcyclopentadienyl sodium with manganous acetate. These reactions are conducted in a tetrahydrofuran solvent (7000 parts) and the sodium reaction is carried out at 100° C. In this instance the tetrahydrofuran is removed prior to thermal stabilization conducted at a temperature of 190° C. The hexylcyclopentadienyl manganese tricarbonyl product is recovered in excellent yields.

EXAMPLE V

Example I is repeated using diethylcyclopentadiene to form the corresponding manganese tricarbonyl product and diethylene glycol methylethyl ether is employed as the solvent. The sodium reaction is conducted at 160° C. In this instance, the thermal stabilization and solvent distillation is conducted simultaneously at the atmospheric boiling point of the solvent.

EXAMPLE VI

Example I is carried out except that indene was used instead of methylcyclopentadiene to form indenyl magganese tricarbonyl. Triethylene glycol dimethyl ether is used as a solvent. The sodium reaction is carried out at 200° C. Similar results are obtained with cyclohexyl amine as the solvent and with aniline as the solvent.

EXAMPLE VII

Example I is repeated except that diethylene glycol dimethyl ether is used as a solvent and no aromatic hydrocarbon is employed in the recovery steps. The diethylene glycol dibutyl ether has a boiling point higher than the product and thus the final separation is conducted between the product and the diethylene glycol dibutyl ether; the methylcyclopentadienyl manganese tricarbonyl is removed as the overhead fraction.

When the above examples are repeated using other alkali metals such as potassium, lithium, or using other manganous salts such as manganous oxides, nitrates, nitrites, sulfates, sulfites, butyrates, propionates and the like, similar results are obtained. Likewise when the manganous salt reaction is conducted at temperatures of 180° and 210° C. comparable results are obtained. The carbonylation reaction is carried out with similar results when carbon monoxide pressures of 200, 400 and 1000 p.s.i.g. are employed when the temperature of the reaction is variable such as using temperatures of 180, 190 and 220° C. When greater quantities of cyclopentadiene dimer are present in the impure reaction product, e.g. when larger excesses of the hydrocarbon are used in the reaction, similar results are obtained. Thus when the reaction products of the above examples is 20, 50 and 100 percent hydrocarbon polymer, based upon the weight of the product, virtually identical results are obtained.

The reaction of sodium and cyclopentadiene or its derivatives can be conducted in ether or amine solvents at widely varying temperature conditions, generally from about −50° to 300° C. The preferred temperature depends both upon the specific solvent employed and upon the cyclopentadiene hydrocarbon which is reacted with sodium. Some of the cyclopentadiene compounds are difficult to maintain in monomeric form and thus they are more convenient to use in dimeric or low polymeric form. With these compounds, temperatures in the range of 150° to 250° C. are preferred, especially between 180° and 195° C. When monomeric cyclopentadiene compounds are used, temperatures in the range of 100° to 150° C. give best results. Above 100° C. the sodium is in liquid form and thus the system can be merely agitated mildly to maintain a homogeneous mixture of the sodium and the reaction medium.

Many of the most useful cyclopentadiene hydrocarbons have a relatively low boiling point, at least in their monomeric form. With these hydrocarbons, the feed to the sodium reaction is maintained essentially equivalent to their rate of reaction to prevent vaporization and loss with the evolved hydrogen. It is found, however, that under the conditions of the present invention, excellent reaction rates and yields can be obtained even with the low boiling cyclopentadiene compounds without appreciable loss with the generated hydrogen. The maintenance of a reflux system in the sodium reaction can be used to increase the efficiency of hydrocarbon utilization at the more elevated temperatures.

Ethers and amines are used in the process. Typical examples of ethers are dimethyl ether, methyl ethyl ether, methyl isopropyl ether, n-isopropyl ether or a mixture of these ethers. Polyethers are also suitable in the present invention and include ethylene glycol diethers and polyethylene glycol diethers, the diethylene glycol ethers being preferred. Typical examples are ethylene glycol dimethyl ether, ethylene glycol methyl ethyl ether, ethylene glycol ethyl ethyl ether, ethylene glycol methyl butyl ether, ethylene glycol butyl lauryl ether and the like. Typical examples of the preferred diethylene glycol diethyl ethers are the dimethyl, ethyl methyl, diethyl, ethyl butyl, dibutyl, and butyl lauryl ethers. Best results are obtained with alkyl groups of from 1 to 6 carbon atoms.

Other suitable ethers are triethylene glycol ethers such as dimethyl, diethyl, methyl methyl, etc., glycerol ethers such as trimethyl, dimethyl ethyl, diethyl methyl, etc., and cyclic ethers such as dioxane, tetrahydrofuran, methyl glycerol formal and dimethylene pentaderythrite.

A wide variety of amines are suitable for use as solvents in the present invention, including both aliphatic and aromatic amines. Typical examples are dimethyl amine, trimethyl amine, dimethyl ethyl amine, tetramethyl methylene diamine, aniline, methyl aniline, dimethyl aniline, N-methyl morpholine, cyclohexylamine and the like.

The quantity of solvent which can be employed in the sodium reaction, and in the subsequent reactions can vary from about 0.2 part to about 10 parts or more per part of bis(cyclopentadienyl) manganese compound which is formed in the second step of the reaction. The more concentrated recipes are more usually preferred such for example as from about 0.5 to 1.2 mole per mole of reactants. Surprisingly, the more concentrated recipes appear to increase the reaction rate, particularly in the carbonylation step, and yet give highly fluid reaction media through the process. There are many economies involved in the use of a minimum quantity of solvent, particularly in increasing throughput of a unit reaction volume and decreased cost in the separation and recovery of the solvent.

The sodium cyclopentadienyl compound, preferably the reaction product of the first reaction, is then reacted with a manganous salt, either inorganic or organic. Best results are obtained with the manganous halides and particularly the chloride. However, very good results are also obtained with organic salts such as manganous acetate. Many of the manganous salts are hydroscopic and best results are obtained if the salt is maintained in an anhydrous form. Typical examples of suitable manganous salts are manganous chloride, bromide, iodide, fluoride, nitrate, sulphate, sulphide and various oxides such as MnO, $Mn_2O_3$ and the like. The quantity of manganous salt employed for reaction with the sodium cyclopentadienyl compound is important. Molar quantities of from 0.3 to about 1.5 of manganous salt to sodium cyclopentadienyl compound can be used, although is it best to use a slight excess of manganous salt. Thus from about 1.05 to 1.5 moles of manganous salt should be used per 2 moles of cyclopentadienyl sodium compound. With lower concentrations of manganous salt, the reaction medium tends to gel, making agitation and heat transfer difficult.

Higher concentrations of manganous salt can be used when a reducing agent is used in the carbonylation step, such as a group I-III metal, metal hydride or organo metal compound containing a metal to carbon bond. Under these conditions, an equal molar quantity of cyclopentadienyl sodium and manganous salt is employed.

The temperature of the manganous salt reaction can be from about 50° to 250° C. A more preferred temperature range is from between 100° and 200° C. The pressure of the reaction can be atmospheric or subatmospheric. Superatmospheric pressures can also be used and is desirable when a low boiling solvent is employed, i.e. solvents which boil below reaction temperature.

The carbonylation reaction can be conducted either with gaseous carbon monoxide or with a compound which liberates carbon monoxide, such as a metal carbonyl. When gaseous carbon monoxide is employed, it is best to operate under pressure although pressures of from about atmospheric to about 10,000 p.s.i.g. can be used. Excellent reaction rates are obtained with pressures of 200 to 1000 p.s.i.g. carbon monoxide pressure.

Compounds which liberate carbon monoxide useful in this connection are any of the metal carbonyls. The desirable metal carbonyls are carbonyls of those metals having an atomic number of 23-79 of groups IB, VB, VIB and VIII of the periodic table. The group VIII metal carbonyls are particularly desirable for this purpose, especially iron pentacarbonyl.

Use of the above metal carbonyls as a source of carbon monoxide is particularly desirable since cyclopentadienyl metal by-products are formed, e.g. ferrocene is formed when using iron pentacarbonyl. These cyclopentadienyl metal by-products can thereafter be decomposed to regenerate the cyclopentadiene and metal. The cyclopentadiene can then be recycled to the process and the metal treated with additional carbon monoxide, preferably inexpensive dilute carbon monoxide, to regenerate the metal carbonyl. The regenerated metal carbonyl can also be reused in the process. A suitable technique for decomposition of cyclopentadienyl metal compounds, such as ferrocene is given in the J. of Am. Chem. Soc., vol. 79, p. 2746 et seq.

The temperature of the carbonylation reaction, as pointed out above, can be conducted at temperatures of from about 50° to 300° C., although the most preferred temperature range is from about 150° to 250° C. Very excellent reaction rates are obtained at temperatures of 190° to 250° C.

We claim:

1. The process of separating mixtures of cyclopentadienyl manganese tricarbonyl in which the cyclopentadienyl moiety is a hydrocarbon group having from 5-13 carbon atoms and a cyclopentadiene hydrocarbon having from 5-13 carbon atoms, said hydrocarbon being in polymeric form, comprising heating said mixture to a temperature between about 160° C. and the decomposition temperature of said cyclopentadienyl manganese tricarbonyl to thermally stabilize said mixture and fractionating said stabilized mixture to separate the cyclopentadiene hydrocarbon from said cyclopentadienyl manganese tricarbonyl.

2. The process of claim 1 wherein said heating is conducted for a period from about 1 minute to 1 hour.

3. The process of separating mixtures of cyclopentadienyl manganese tricarbonyl in which the cyclopentadienyl moiety is the hydrocarbon group having from 5-13 carbon atoms, a cyclopentadienyl hydrocarbon having from 5-13 carbon atoms, said hydrocarbon being in polymeric form, and an inert solvent selected from the group consisting of ethers and amines comprising subjecting said mixture to a temperature between about 160° C. and the decomposition temperature of said cyclopentadienyl manganese tricarbonyl to thermally stabilize said mixture and simultaneously fractionating said stabilized mixture to separate the cyclopentadiene hydrocarbon and the solvent from said cyclopentadienyl manganese tricarbonyl.

4. The process of claim 3 wherein the cyclopentadienyl manganese tricarbonyl is methylcyclopentadienyl manganese tricarbonyl, the cyclopentadiene hydrocarbon is methylcyclopentadiene, the solvent is a diethylene glycol dialkyl ether having alkyl groups with 1 to 6 carbon atoms and the mixture is maintained within said temperature range for a period of from 10 minutes to 1 hour.

5. The process of claim 3 wherein the solvent is diethylene glycol dimethyl ether.

6. The process of claim 1 wherein the cyclopentadienyl manganese tricarbonyl is methylcyclopentadienyl manganese tricarbonyl.

References Cited in the file of this patent
UNITED STATES PATENTS 2,818,417   Brown et al. _____ Dec. 31, 1957